United States Patent
Ekberg et al.

(10) Patent No.: US 8,601,285 B2
(45) Date of Patent: Dec. 3, 2013

(54) METHOD FOR SECURE PROGRAM CODE EXECUTION IN AN ELECTRONIC DEVICE

(75) Inventors: Jan-Erik Ekberg, Vantaa (FI); Aarne Rantala, Espoo (FI)

(73) Assignee: Nokia Corporation, Espoo (FI)

( * ) Notice: Subject to any disclaimer, the term of this patent is extended or adjusted under 35 U.S.C. 154(b) by 420 days.

(21) Appl. No.: 12/744,463

(22) PCT Filed: Nov. 23, 2007

(86) PCT No.: PCT/FI2007/050636
§ 371 (c)(1),
(2), (4) Date: May 24, 2010

(87) PCT Pub. No.: WO2009/065997
PCT Pub. Date: May 28, 2009

(65) Prior Publication Data
US 2010/0262841 A1    Oct. 14, 2010

(51) Int. Cl.
*G06F 12/14* (2006.01)
(52) U.S. Cl.
USPC ........... 713/193; 713/165; 713/166; 713/167; 713/189; 713/194; 380/277; 380/278
(58) Field of Classification Search
USPC ......... 713/165–167, 190–191, 189, 193–194; 380/277–278
See application file for complete search history.

(56) References Cited

U.S. PATENT DOCUMENTS

| | | | |
|---|---|---|---|
| 6,327,652 B1 | 12/2001 | England et al. | |
| 6,330,670 B1 | 12/2001 | England et al. | |
| 7,080,249 B1 * | 7/2006 | Jakubowski et al. | ......... 713/165 |
| 7,461,249 B1 | 12/2008 | Pearson et al. | |
| 7,681,046 B1 | 3/2010 | Morgan et al. | |
| 2001/0037450 A1 * | 11/2001 | Metlitski et al. | ............... 713/152 |
| 2002/0087877 A1 * | 7/2002 | Grawrock | ...................... 713/200 |
| 2003/0033537 A1 | 2/2003 | Fujimoto et al. | |
| 2003/0191942 A1 | 10/2003 | Sinha et al. | |
| 2003/0204743 A1 | 10/2003 | Devadas et al. | |
| 2005/0144448 A1 | 6/2005 | England et al. | |
| 2005/0149730 A1 | 7/2005 | Aissi et al. | |

(Continued)

FOREIGN PATENT DOCUMENTS

| | | |
|---|---|---|
| EP | 1681609 A1 | 7/2006 |
| WO | 2004/070587 A1 | 8/2004 |
| WO | 2006/034399 A2 | 3/2006 |
| WO | 2006/131921 A2 | 12/2006 |

OTHER PUBLICATIONS

Final Office Action from related U.S. Appl. No. 11/638,405 dated Jul. 23, 2010 (33 pages).

(Continued)

*Primary Examiner* — Yin-Chen Shaw
(74) *Attorney, Agent, or Firm* — Harrington & Smith

(57) ABSTRACT

The invention relates to a method for secure piecemeal execution of a program code. In the method, the program code is split to a number of pieces in a first electronic device. The pieces are provided one after another to a second electronic device, which computes a message authentication code from the pieces and returns the authenticated pieces back to the first electronic device. In order to execute the program, the authenticated pieces are provided for execution to the second electronic device, which verifies the message authentication codes in the pieces to allow the execution of the pieces in the second electronic device.

14 Claims, 10 Drawing Sheets

(56) References Cited

U.S. PATENT DOCUMENTS

| | | |
|---|---|---|
| 2005/0278527 A1 | 12/2005 | Liao et al. |
| 2006/0026441 A1 | 2/2006 | Aaron |
| 2006/0294370 A1* | 12/2006 | Greenspan .................... 713/164 |
| 2007/0179904 A1 | 8/2007 | Hofstee et al. |
| 2007/0204165 A1 | 8/2007 | Lytle et al. |
| 2008/0066075 A1 | 3/2008 | Nutter et al. |
| 2008/0148062 A1 | 6/2008 | Ekberg et al. |
| 2011/0047630 A1* | 2/2011 | Cheng et al. .................... 726/34 |

OTHER PUBLICATIONS

Non-Final Office Action from related U.S. Appl. No. 11/638,405 dated Jan. 28, 2010 (28 pages).

Office Action received in corresponding U.S. Appl. No. 11/638,405, Dated Dec. 8, 2011, 28 pages.

International Search Report and Written Opinion of the International Searching Authority from PCT/FI2007/050636 dated Jul. 29, 2008, pp. 1-13.

International Search Report and Written Opinion of the International Searching Authority from PCT/FI2007/050658 dated Apr. 8, 2008, pp. 1-14.

Suh et al., "Design and Implementation of the AEGIS Single-Chip Secure Processor Using Physical Random Functions", International Symposium on Computer Architecture, Jun. 4-8, 2005, pp. 1-12.

\* cited by examiner

METHOD FOR SECURE PROGRAM CODE EXECUTION IN AN ELECTRONIC DEVICE

RELATED APPLICATION

This application was originally filed as PCT Application No. PCT/FI2007/050636 filed Nov. 23, 2007.

BACKGROUND OF THE INVENTION

1. Field of the Invention

The invention relates to computer system security and communication systems. The invention relates also to a trusted platform module. Particularly, the invention relates to a method for the secure execution of partitioned program code in a communication system.

2. Description of the Related Art

Computer system security is an increasingly important issue today. Along with an expanding gamut of security threats to computer systems such as the infiltration of malicious software components into target systems, it has become important to guard the systems against attacks. As seemingly innocuous data communications may introduce subtle malicious changes to applications in a computer system, it would be a boon to be able to rest assured that a critical application has not been manipulated and remains as it was when purchased or installed. Especially, when monetary transactions and binding contracts are made, it is important for avoiding identity thefts and for rigorous non-repudiation to be able to ensure that an authentication application functions correctly.

Consequently, mobile devices and computing devices are being provided with trusted environments, that is, secure program execution environments. The trusted environments are used to run applications which handle device specific or imported secrets. The applications executed in the trusted range from authentication, electronic commerce to implement digital rights management and copy protection. Trusted environments may be provided in the form of removable modules, that is, plug-in-units or smart cards, which comprise a processor and a memory of their own. However, the memory available in such modules is often limited. As the size of applications tends to grow over time, applications to be executed in a trusted environment may become too large to be executed as a single piece in the secure environment.

It would be beneficial to be able to have a solution which enables applications of significantly larger than the memory in the trusted environment to be executed by the trusted environment without unduly compromising the trust originally provided by the trusted environment.

SUMMARY OF THE INVENTION

The invention relates to a method, comprising: obtaining a program code to a first electronic device; splitting said program code to at least two first program code pieces; providing a first program code piece to a second electronic device, said first program code piece being one of said at least two first program code pieces; computing a message authentication code from said first program code piece in said second electronic device to produce a first authenticated program code piece, said first authenticated program code piece comprising said first program code piece and said message authentication code; providing said first authenticated program code piece to said first electronic device; detecting a need to execute said program code in said first electronic device; providing said first authenticated program code piece to said second electronic device; and verifying said message authentication code from said first authenticated program code piece in order to allow the execution of said first program code piece in said second electronic device.

The invention relates also to an electronic device, comprising: an interface; and an execution entity configured to receive a first program code piece from said interface, said first program code piece being one of at least two first program code pieces from a program code, to compute a message authentication code from said first program code piece to produce a first authenticated program code piece, said first authenticated program code piece comprising said first program code piece and said message authentication code, to provide said first authenticated program code piece to said interface, to receive said first authenticated program code piece from said interface, and to verify said message authentication code from said first authenticated program code piece in order to allow the execution of said first program code piece.

The invention relates also to a method, in which, a program code is split to a number of pieces in a first electronic device. The pieces are provided one after another to a second electronic device, which computes a message authentication code from the pieces and returns the authenticated pieces back to the first electronic device. In order to execute the program, the authenticated pieces are provided one after another for execution to the second electronic device, which verifies the message authentication codes in the pieces to allow the execution of the pieces in the second electronic device.

The invention relates also to an electronic device, comprising: an application environment configured to obtaining a program code, to split said program code to at least two first program code pieces, to provide a first program code piece to a trusted platform module, said first program code piece being one of said at least two first program code pieces, to receive a first authenticated program code piece, to detect a need to execute said program code and to provide said first authenticated program code piece to said trusted platform module.

The invention relates also to an electronic device, comprising: means for receiving a first program code piece from an interface, said first program code piece being one of at least two first program code pieces from a program code; means for computing a message authentication code from said first program code piece to produce a first authenticated program code piece, said first authenticated program code piece comprising said first program code piece and said message authentication code; means for providing said first authenticated program code piece to said interface; means for receiving said first authenticated program code piece from said interface; and means for verifying said message authentication code from said first authenticated program code piece in order to allow the execution of said first program code piece.

The invention relates also to an electronic device, comprising: means for obtaining a program code; means for splitting said program code to at least two first program code pieces; means for providing a first program code piece to a trusted platform module, said first program code piece being one of said at least two first program code pieces; means for receiving a first authenticated program code piece; and means for detecting a need to execute said program code and to provide said first authenticated program code piece to said trusted platform module.

The invention relates also to a system comprising: a first electronic device configured to obtain a program code, to split said program code to at least two first program code pieces, to provide a first program code piece to a second electronic device, said first program code piece being one of said at least two first program code pieces, to receive a first authenticated program code piece, to detect a need to execute said program code and to provide said first authenticated program code piece to said second electronic device; and a second electronic device configured to configured to receive a first program code piece from said first electronic device, said first program code piece being one of at least two first program code pieces from a program code, to compute a message authentication code from said first program code piece to produce a first authenticated program code piece, said first authenticated program code piece comprising said first program code piece and said message authentication code, to provide said first authenticated program code piece to said first electronic device, to receive said first authenticated program code piece from said first electronic device, and to verify said message authentication code from said first authenticated program code piece in order to allow the execution of said first program code piece.

The invention relates also to a computer program embodied on a computer readable medium, the computer program comprising code for controlling a processor to execute a method comprising: receiving a first program code piece from an interface, said first program code piece being one of at least two first program code pieces from a program code; computing a message authentication code from said first program code piece to produce a first authenticated program code piece, said first authenticated program code piece comprising said first program code piece and said message authentication code; providing said first authenticated program code piece to said interface; receiving said first authenticated program code piece from said interface; and verifying said message authentication code from said first authenticated program code piece in order to allow the execution of said first program code piece.

The invention relates also to a computer program comprising code for controlling a processor to execute a method comprising: receiving a first program code piece from an interface, said first program code piece being one of at least two first program code pieces from a program code; computing a message authentication code from said first program code piece to produce a first authenticated program code piece, said first authenticated program code piece comprising said first program code piece and said message authentication code; providing said first authenticated program code piece to said interface; receiving said first authenticated program code piece from said interface; and verifying said message authentication code from said first authenticated program code piece in order to allow the execution of said first program code piece.

The invention relates also to a computer program embodied on a computer readable medium, the computer program comprising code for controlling a processor to execute a method comprising: obtaining a program code; splitting said program code to at least two first program code pieces; providing a first program code piece to a trusted platform module, said first program code piece being one of said at least two first program code pieces; receiving a first authenticated program code piece; and detecting a need to execute said program code and to provide said first authenticated program code piece to said trusted platform module.

The invention relates also to a computer program comprising code for controlling a processor to execute a method comprising: obtaining a program code; splitting said program code to at least two first program code pieces; providing a first program code piece to a trusted platform module, said first program code piece being one of said at least two first program code pieces; receiving a first authenticated program code piece; and detecting a need to execute said program code and to provide said first authenticated program code piece to said trusted platform module.

In one embodiment of the invention, the execution entity in the second electronic device is configured to analyze said first program code piece to determine at least one operation code, to determining an interpreter part based on said at least one operation code, and to request said interpreter part to from said interface. In one embodiment of the invention, the application environment in the first electronic device is configured to analyze said first program code piece to determine at least one operation code, to determining an interpreter part based on said at least one operation code, and to provided said interpreter part to said second electronic device via an interface unit in the second electronic device.

In one embodiment of the invention, the execution entity in the second electronic device is configured to compute a program hash code using the program code pieces formed from the program code. The execution entity is also configured to compute a storage key from a device secret associated with said second electronic device and said program hash code. In one embodiment of the invention, the pieces, when first given to the second device, as a set will form authentication vector H', which will be used to select the right key, in other words, diversify the key for this specific script, that is program code, and the key will be used to personalize encrypted data for this program, that is the set of program code pieces.

In one embodiment of the invention, said execution entity in the second electronic device is configured to compute authentication data from a memory entry using said storage key, to associate said memory entry with said authentication data, submit said memory entry and said authentication data for storage via said interface, for example, to the first electronic device. The execution entity is configured to receive said memory entry and said authentication data, for example, from the first electronic device via said interface, and to verify said authentication data, and to provide said memory entry to a second program code piece being executed, said second program code piece being one of said at least two first program code pieces. The at least two first program code pieces may comprise the entire original program code as originally obtained to the first electronic device.

In one embodiment of the invention, said execution entity in the second electronic device is configured to form a first epoch key, to replace said first epoch key with a second epoch key, to obtain a first value for a first memory entry, to encrypt said first memory entry with said second epoch key, to add said first memory entry to a first chained checksum, to set an indicator value in at least one hash bucket computed using said first memory entry, to send said first memory entry to said interface, to obtain a second value for said first memory entry, to encrypt second time said first memory entry with said second epoch key, to add second time said first memory entry to said first chained checksum and to set second time an indicator value in at least one hash bucket computed using said first memory entry. In one embodiment of the invention, the at least one hash buckets are part of a Bloom filter.

In one embodiment of the invention, said execution entity in the second electronic device configured to check the at least one hash bucket whether said indicator value is set, to replace said second epoch key with a third epoch key, to retrieving at least three memory entries via said interface, said at least three memory entries comprising said first memory entry, to decrypt and encrypt the memory entries where the at least one hash bucket does not have said indicator value set, said at memory entries being among said at least three memory entries, to form a second chained checksum, which does not comprise said first memory entry, to compare said first chained checksum and said second chained checksum and to accept said first memory entry if said checksums match. In one embodiment of the invention, the interface connects the first and the second electronic devices.

In one embodiment of the invention, a first epoch key is formed in said second electronic device. Said first epoch key is replace with a second epoch key. A first value is obtained for a first memory entry. Said first memory entry is encrypted with said second epoch key. Said first memory entry is added to a first chained checksum. An indicator value is set, for example, to 1 or Boolean 'true' in at least one hash bucket computed using said first memory entry. Said first memory entry is provided to the first electronic device. A second value is obtained for said first memory entry. Said first memory entry is encrypted second time with said second epoch key, this time the value may be different. Said first memory entry is added second time to said first chained check-sum and an indicator value is set second time in at least one hash bucket computed using said first memory entry.

In one embodiment of the invention, the at least one hash bucket is checked to determine whether said indicator value is set. Said second epoch key is replaced with a third epoch key. At least three memory entries are retrieved, said at least three memory entries comprising said first memory entry. The memory entries where the at least one hash bucket does not have said indicator value set are decrypted and encrypting, said at memory entries being among said at least three memory entries. A second chained checksum is formed, which does not comprise said first memory entry. The first chained checksum is compared to the second chained checksum. The first memory entry is accepting, if said checksums match.

In one embodiment of the invention, the execution entity in the second electronic device is configured to compute said message authentication code using counter mode encryption using an identifier or a start address of said first program code piece. The computation may use, for example, the Advanced Encryption Standard algorithm in counter mode. The start address of said first program code piece may be relative to the start of the program code.

In one embodiment of the invention, said second electronic device comprises a trusted platform module.

In one embodiment of the invention, said first electronic device comprises a mobile communication device such as a cellular phone or a personal communicator device.

In one embodiment of the invention, the first electronic device further comprises the permanent storage, which may be comprised in a secondary memory, for example, as a disk partition, directory or a file. The permanent storage may be at least part of the storage space of a computer readable medium such as a flash memory, a magnetic or an optic disk.

In one embodiment of the invention, the first electronic device further comprises said trusted platform module configured to store key formed during an initialization and an execution phase.

In one embodiment of the invention, a cryptographic transform, in other words, a signing transformation algorithm to produce a message authentication code is an encryption or a decryption algorithm. In one embodiment of the invention, a cryptographic transform is an algorithm separate from encryption or decryption algorithms.

In one embodiment of the invention, a cryptographic transform is used when at least one memory entry is certified with a signing key.

In one embodiment of the invention, said mobile communication device comprises a mobile station. In one embodiment of the invention, the mobile communication device comprises at least one of a Global System of Mobile Communications (GSM) device and a Universal Mobile Telephone System (UMTS) device. The mobile terminal may be, for example, a GSM mobile station or a UMTS mobile station with a dual mode or multimode functionality to support different access types.

In one embodiment of the invention, the computer program is stored on a computer readable medium. The computer readable medium may be a removable memory card, magnetic disk, optical disk or magnetic tape.

The embodiments of the invention described hereinbefore may be used in any combination with each other. Several of the embodiments may be combined together to form a further embodiment of the invention. A method, a system, an electronic device or a computer program to which the invention is related may comprise at least one of the embodiments of the invention described hereinbefore.

The benefits of the invention are related to better processing capacity for computer programs, that is, the capability to execute larger applications in a secure environment and the possibility to execute larger applications securely.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1A:
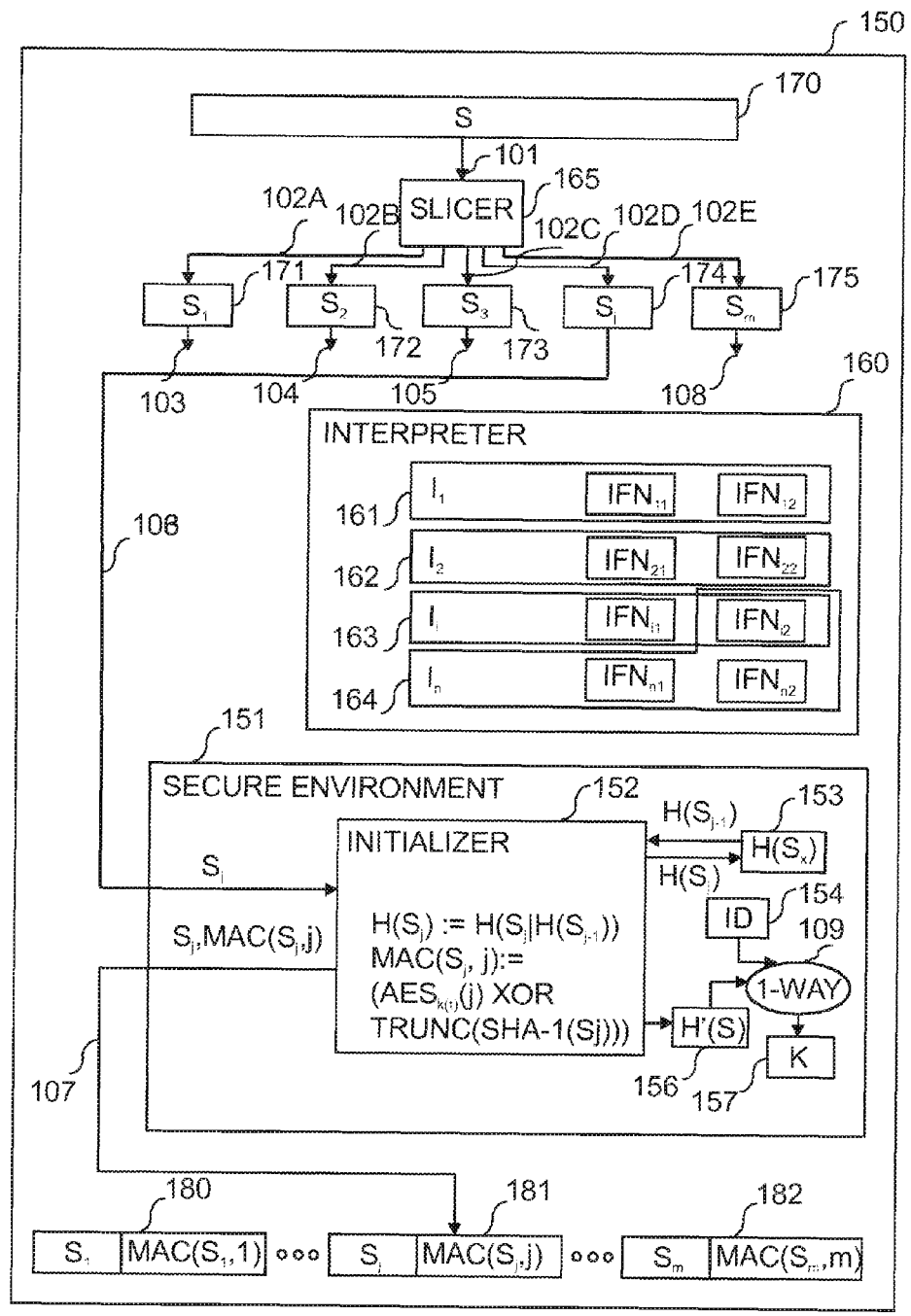
FIG. 1A is a block diagram illustrating a secure environment and a computer executing an initialization phase in the piecemeal interpretation of a program code in one embodiment of the invention.

FIG. 1A is a block diagram illustrating a secure environment and a computer executing an initialization phase in the piecemeal interpretation of a program code in one embodiment of the invention. In FIG. 1A there is a computer 150, which may be any computer, for example, a desktop computer, a laptop computer, a palmtop computer, a personal communicator, a mobile telephone or a plug-in-unit in a blade server. Computer 150 comprises at least a processor (not shown) and a memory (not shown). Computer 150 comprises a secure environment 151, which may be, for example, a trusted platform module. Secure environment 151 comprises also a processor (not shown), a memory (not shown) and an interface (not shown) to computer 150. Computer 150 comprises an application environment (not shown), which comprises at least interpreter entity 160 and slicing entity 165. The application environment communicates with secure environment 151. Initially computer 150 stores interpreter entity 160. In interpreter entity 160 comprises in FIG. 1A eight functional entities, namely, interpreter functional entities $IFN_{11}$, $IFN_{12}$, $IFN_{21}$, $IFN_{22}$, $IFN_{i1}$, $IFN_{i2}$, $IFN_{n1}$ and $IFN_{n2}$. Interpreter 160 is executed in parts, each of which comprises at least one functional entity. At least two parts may use at least one shared functional entity. There may also be part specific program code. In FIG. 1A interpreter 160 is formed of parts $I_1$ 161, $I_2$ 162, $I_i$ 163 and $I_n$ 164. Each interpreter part may be responsible for at least one operation code and the completion of the operations that correspond to the operation code. The operations may be implemented with at least one interpreter functional entity. The operations may be involved, for example, with the handling of memory outside secure environment 151, memory inside secure environment 151, or arithmetic operations. It should be noted that the numbers of entities and parts herein have been selected for purposes of illustration only and may vary in actual implementations of the invention.

Initialization phase for piecemeal interpretation starts when a program code S 170 is provided to computer 150. Program code S may be provided to computer 150 from a remote network node communicating with computer 150 or from a computer readable medium read to memory in computer 150. Program code S is first provided to a slicing entity 165, as illustrated with arrow 101, which by being made aware of memory available in secure environment 151, slices program code S to at least two pieces such as $S_1$ 171, $S_2$ 172, $S_3$ 173, $S_j$ 174 and $S_m$ 175, as illustrated with arrows 102A, 102B, 102C, 102D and 102E. Slicing entity 165 receives the properties such as the memory available in secure environment 151 by secure environment 151. This occurs before the slicing occurs. Each program code slice, in other words, a program code piece comprises at least one instruction, that is, one operation code and associated parameters. In one embodiment of the invention, the sizes of the program code slices may vary from slice to slice. In one embodiment of the invention, smaller than maximum size program code slices are formed when the size of a subroutine, program module, method implementation or a function does not exceed the maximum size imposed by the available memory secure environment 151. Program code S may have been previously parsed and compiled from program code source to a virtual machine code executable by interpreter 160.

Slices 171-175 are thereupon provided in the order of their indexes or their order of execution to secure environment 151 for an initialization entity 152 executing in secure environment 152. Together with slices 171-175 to secure environment is provided their respective indexes of slices 171-175.

In one embodiment of the invention, the indexes for slices are not continuous, that is, the index numbers are allowed to have gaps. The index numbers may represent, for example, the start addresses of slices 171-175 relative to the start of original program code S 170. For example, if a slice starts with an operation code, the displacement of which in the memory from the start of program code S is 35200 bytes, the index for that particular slice becomes 35200.

Initialization entity may be, for example, a software component. First slices 171-173, namely slices $S_1, S_2$ and $S_3$ are provided to initialization entity 152 as illustrated with stub arrows 103-105. The providing of slice $S_j$ is only illustrated in FIG. 1A for purposes of clarity. The index j is an arbitrary natural number, wherein $3 \le j \le m$. In one embodiment of the invention, the index j represents the start address of slice $S_j$ relative to the start of program code S 170. In this embodiment, the intervening index values not corresponding to a start address have no program code piece associated with them. In one embodiment of the invention the slices are numbered based on their continuous order numbers.

The processing of other slices is similar to the processing of slice $S_j$. Slice $S_j$ is provided to initialization entity 152 within secure environment 151 as illustrated with arrow 106.

Upon receiving slice $S_j$ initialization entity 152 computes an aggregated hash $H(S_j):=H(S_j|H(S_{j-1}))$ by using a concatenation of $S_j$ and so far computed aggregated hash $H(S_{j-1})$, illustrated with the arrow with label $H(S_{j-1})$, which is stored to memory in secure environment, as illustrated with box 153, comprising value $H(S_x)$, wherein x stands for the index of the previous slice. The concatenation operation is illustrated with the character "|". After the computation of the aggregated hash $H(S_j)$, the new value is stored to the memory in secure environment 151, as illustrated with arrow with the label $H(S_j)$. At the end of the initialization phase, after the processing of each slice up to $S_m$ the function computed equals $H'(S):=H(S_m|H(S_{m-1}|\ldots|H(S_1)))$, wherein H' stands for the complete aggregated hash result. In one embodiment of the invention, the index m is an arbitrary integer that represents the total number of the slices produced by the slicing entity 165 from program code S. In one embodiment of the invention, the index m is the displacement of slice $S_j$ from the start of program code S 170. In one embodiment of the invention the previous slice is $S_{j-q}$, wherein q is the size of the previous slice, for example, in bytes. Upon receiving slice $S_j$ initialization entity 152 computes also a message authentication code $MAC(S_j, j)$, for example, using the Advanced Encryption Standard (AES) so that $MAC(S_j, j):=(AES_{k(t)}(j)$ XOR $TRUNC(SHA-1(S_j)))$, wherein k(t) is a randomly generated key specific to the initialization and execution phase of program code S. The result of the secure hash function SHA-1 is truncated to match the block length in AES, for example, 128 bits. AES is used in counter mode. In one embodiment of the invention the value j may also be subjected to an arithmetic operation where a fixed nonce changes the value of each j before encryption, wherein $1 \le j \le m$. The use of AES is only an example of a cryptographic transform to produce $MAC(S_j, j)$, for example, Data Encryption Standard (DES-3), Blowfish or the Rijndael algorithm could also be used. The values $S_j$, $MAC(S_j, j)$ are returned from secure environment 152 to memory in computer 150 as illustrated with arrow 107. In FIG. 1A there is illustrated the chain of produced $S_x$ and $MAC(S_x, x)$ authenticated slices 180, 181 and 182. The values $S_j$, $MAC(S_j, j)$ become the authenticated slice 181 when stored in the memory of computer 150. Final slice $S_m$ is fed to processing in secure environment 151 and initialization entity 151, as illustrated with stub arrow 108. The processing of slice $S_m$ is similar to the processing of other slices. The complete aggregated hash result H'(S) is stored to the memory in secure environment 151 as illustrated with box 156. Finally, a device secret 154 and H'(S) 156 are provided as arguments to a one-way function 109, which produces as a result a memory key K 157 that will be used to protect data or authenticate the origin of data stored by program code S outside secure environment 150, for example, in the memory of computer 150.

In one embodiment of the invention, the pieces, when first given to the second device, as a set will form authentication vector H', which will be used to select the right key, in other words, diversify the key for this specific script, that is program code, and the key will be used to personalize encrypted data for this program, that is the set of program code pieces.

Figure 1B:
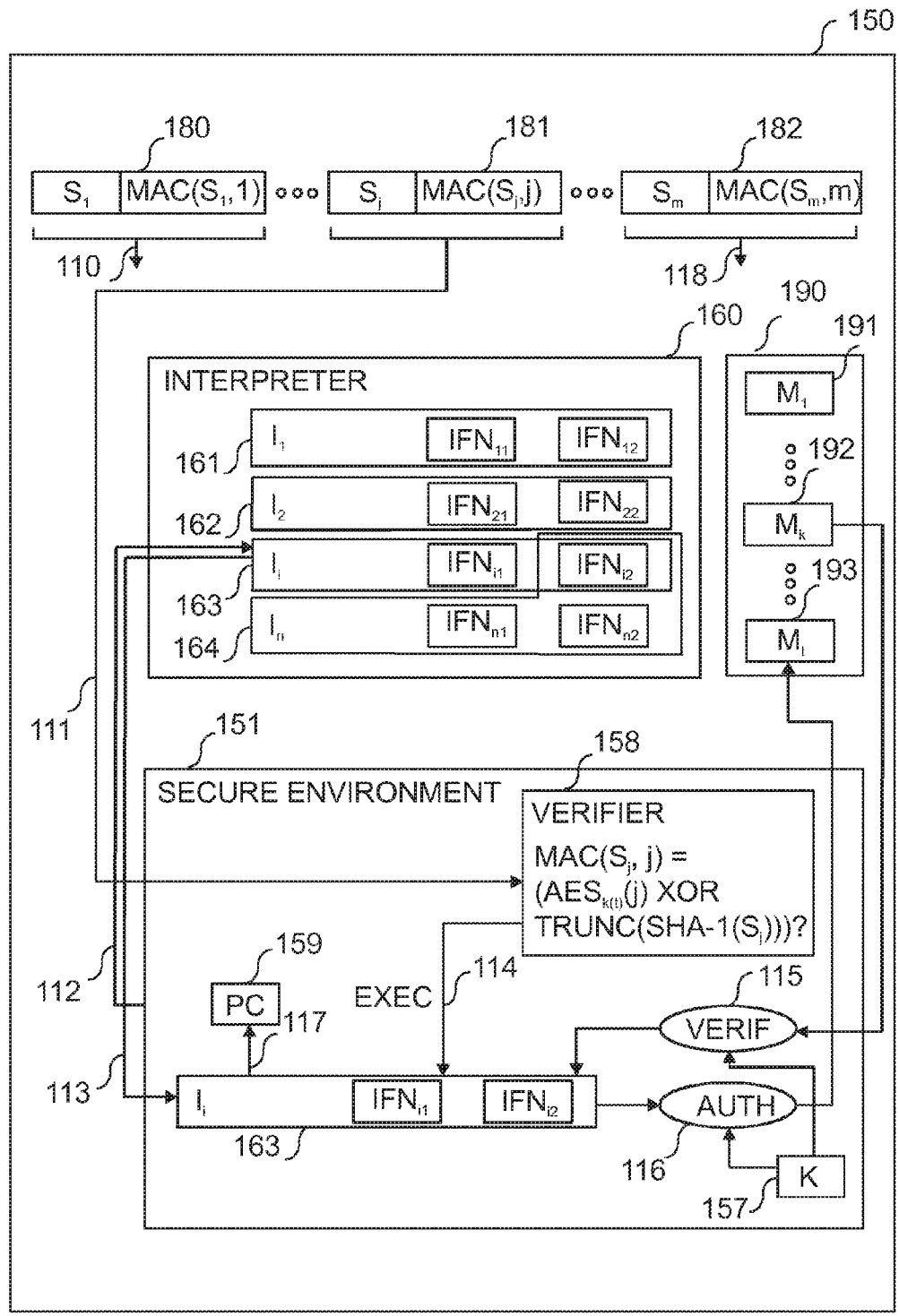
FIG. 1B is a block diagram illustrating a secure environment and a computer executing piecemeal interpretation of a program code in one embodiment of the invention.

FIG. 1B is a block diagram illustrating a secure environment and a computer executing piecemeal interpretation of a program code in one embodiment of the invention. The starting point in FIG. 1B is that the initialization phase of FIG. 1A or a similar initialization phase has been executed. After the initialization phase, computer 150 is made available for the repeated execution of program code S, which means, for example, that program code S is allowed to enter into production mode where it is subject to at least some data security threats, for example, by allowing non-administrator user login or network communications. In FIG. 1B is illustrated a memory array 190, which comprises array entries, that is, memory entries 191, 192 and 193.

To enable the execution of sliced program code S in secure environment 151, computer 150 stores data origin authenticated slices, in short, authenticated slices 180, 181 and 182, each of which comprise the actual slice program code $S_x$ and the accompanying message authentication code $MAC(S_x, x)$ computed from the slice. Data origin authentication means that the provider of a data origin authenticated slice must have been in possession of the key and slice $S_x$ used to produce $MAC(S_x, x)$. As a first step of the execution, authenticated slice 180 is provided to secure environment 151 and therein to a verification entity 158. The providing of authenticated slice 180 is illustrated with stub arrow 110.

Later at some point in time during the execution of authenticated slices 180-182, to implement the logic of program code S, secure environment 151 determines from the value in a program counter 159 that next authenticated slice to be executed is authenticated slice 181, namely, $S_j$, $MAC(S_j, j)$. Secure environment 151 indicates to computer 150 the program counter value and computer 150 provides in response authenticated slice 181 to secure environment 151 and authenticated slice 181 is obtained to verification entity 158, as illustrated with arrow 111.

In one embodiment of the invention, a value q in program counter 159 directly indicates the authenticated slice 181 to the area of which execution is to proceed. For example, if $j <= q < j+o$, the next authenticated slice to be executed is $S_j$, wherein j+o is the index of the subsequent authenticated slice $S_{j+o}$, o is the size of slice $S_j$ and j is the start address of slice $S_j$ relative to the start of program code S. The start address may be expressed in bytes.

Secure environment 151 also analyses program code in authenticated slice 181 and determines the required interpreter part $I_i$ 163 to execute program code $S_j$. Secure environment 151 requests the interpreter part 163 from computer 150, as illustrated with arrow 112. The providing of interpreter part 163 to secure environment 151 in response is illustrated with arrow 113. In response to the obtaining of authenticated slice 181, verification entity 158 verifies the message authentication code $MAC(S_j, j)$ from authenticated slice 181. Verification entity 158 may be, for example, a software component. Verification entity 158 computes a second $MAC(S_j, j)'$ by setting $MAC(S_j, j)' := (AES_{k(t)}(j)\ XOR\ TRUNC(SHA\text{-}1(S_j)))$, wherein k(t) is the previously computed key specific to the initialization and execution phase of program code S. This time AES encryption is also used, if AES encryption was used at the initialization phase by initialization entity 152. Upon verifying a MAC that has been formed earlier using a cryptographic transformation, the cryptographic transformation is recalculated in the same way as at the time when the MAC was formed. In other words, the cryptographic transformation is used as a one-way transformation. The use of AES is only an example of a cryptographic transform to produce $MAC(S_j, j)'$, for example, Data Encryption Standard (DES-3), Blowfish or the Rijndael algorithm could also be used. If $MAC(S_j, j)' = MAC(S_j, j)$, the verification is successful and it is verified that $S_j$ has not been tampered in between. If verification fails, an alert is raised, for example, via the user interface and the execution may be terminated.

Thereupon, an execution request is given to execute $S_j$, as illustrated with arrow 114. Interpreter part $I_i$ 163 executes $S_j$ and determines the next program counter value, which is stored to the memory in secure environment 151, as illustrated with box 159. The program counter value is used to determine the next authenticated slice to be obtained to secure environment 151. In one embodiment of the invention, program code slice $S_j$ comprises several instructions. Program counter may take many steps within the slice and the next slice is requested only when the program counter exits the slice by executing sequential instructions out of the slice area to the next slice or by jumping out of the slice due to the execution of a jump instruction.

In case access to memory array 190 is needed, based on the instructions in $S_j$ interpreter part $I_i$ fetches a memory entry $M_k$ 192 to secure environment 158 wherein at step 115 the memory entry $M_k$ is either decrypted using key K or a message authentication code comprised in it is checked using K for possible tampering. In one embodiment of the invention memory entries are encrypted. In one embodiment of the invention memory entries are provided in unencrypted form, but checked against tampering with an associated message authentication code. In one embodiment of the invention, the entire memory array is encrypted with K and obtained as a single block to secure environment 151. In one embodiment of the invention, all temporary data needed in the execution of program code S is maintained in secure environment 151 in its entirety. Contents of memory entry 192 in plaintext are provided to interpreter part $I_i$, which may provide during its execution with $S_j$ in response an altered memory entry 193. At step 116 the plaintext contents are furnished with a message authentication code computed using key K or the plaintext contents are encrypted with key K. The altered memory entry 193 is provided to memory array 190 in computer 150.

Finally, last authenticated slice 182 is provided to secure environment 151, as illustrated with arrow 182. Thereupon, the execution of program code S slices 180-183 is complete.

In one embodiment of the invention, interpreter 160 is not fragmented to pieces, but provided to the secure environment 151 in its entirety. Only program code S is sliced and executed in slices as described hereinbefore in FIGS. 1A and 1B. This is possible, if secure environment 151 has a sufficiently large memory.

In one embodiment of the invention, interpreter parts may be subroutines or method implementations bound run-time to a main part of interpreter 160.

Figure 2A:
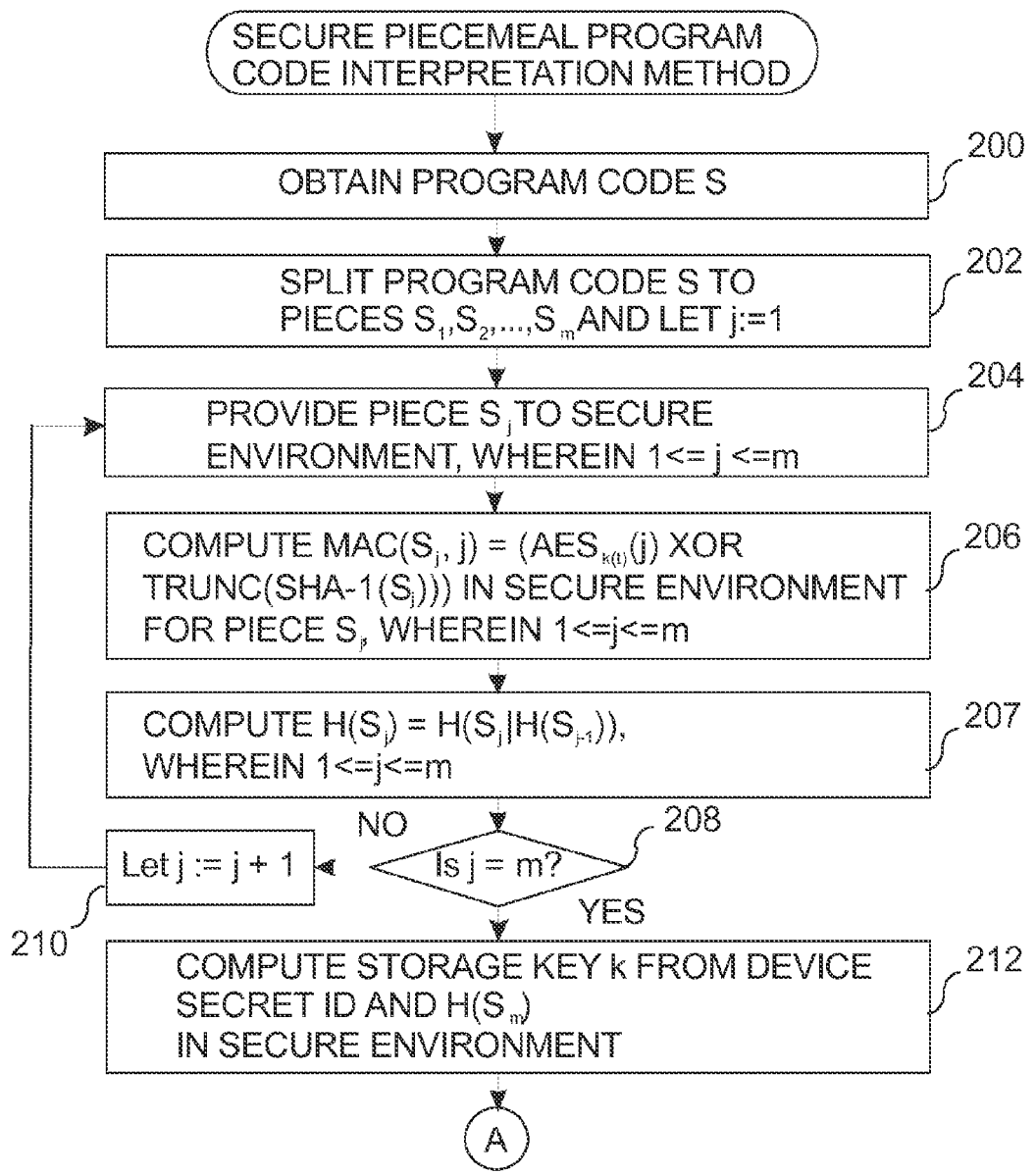
FIG. 2A is a flow chart illustrating a method for secure piecemeal program code interpretation in one embodiment of the invention.

FIG. 2A is a flow chart illustrating a first part of a method for secure piecemeal program code interpretation in one embodiment of the invention.

At step 200 a program code S is obtained, for example, to computer 150 as illustrated in FIGS. 1A and 1B.

At step 202 program code S is split to pieces $S_1, S_2, \ldots, S_m$, wherein m stands for an arbitrary integer m. In one embodiment of the invention a counter j is set to 1. In one embodiment of the invention, counter j is set to the start address of the first program code piece. The start address of the first program code piece relative to the start of the original program code that has not been split may be zero. In one embodiment of the invention, the splitting is performed in a splitting entity in the computer.

At step 204 a piece Sj being one of $S_1, S_2, \ldots, S_m$ is provided to a secure environment, for example, a trusted platform module.

At step 206 a message authentication code $MAC(S_j,j)$ is computed of $S_j$ and associated therewith.

The computation is, for example, $MAC(S_j,j):=(AES_{k(t)}(j)$ XOR $TRUNC(SHA-1(S_j)))$, wherein k(t) is, for example, a randomly generated key. The computation is performed, for example, in the secure environment communicating with the computer.

At step 207, in one embodiment of the invention, an aggregated hash is cumulated using $S_j$. For example, by setting $H(S_j):=H(S_j|H(S_{j-1}))$ by using a concatenation of $S_j$ and so far computed aggregated hash $H(S_{j-1})$. The concatenation operation is illustrated with the character "|". The computation is performed, for example, in the secure environment. In one embodiment of the invention from j is subtracted the size of the previous slice to obtain the index, that is, the start address of the previous slice.

At step 208 it is checked if last program code slice $S_m$ is being processed, in other words, if j=m. If this is the case, the method continues at step 212, otherwise the method continues at step 210. This check may be performed in the computer or in the secure environment.

At step 210 index j is incremented by 1. In one embodiment of the invention, index j is incremented by the size of the $S_j$ so that index j corresponds to the start address of the next slice to be executed.

At step 212, in one embodiment of the invention, a storage key k is computed from a device secret and $H(S_m)$. In one embodiment of the invention, the computation is performed, for example, in the secure environment.

In one embodiment of the invention, more precisely the cumulative result from all rounds is $H'(S):=H(S_m|H(S_{m-1})|\ldots |H(S_1)))$, wherein H' stands for the complete aggregated hash result. The index m is an arbitrary integer that represents the total number of the slices produced by a slicing entity from program code S.

Figure 2B:
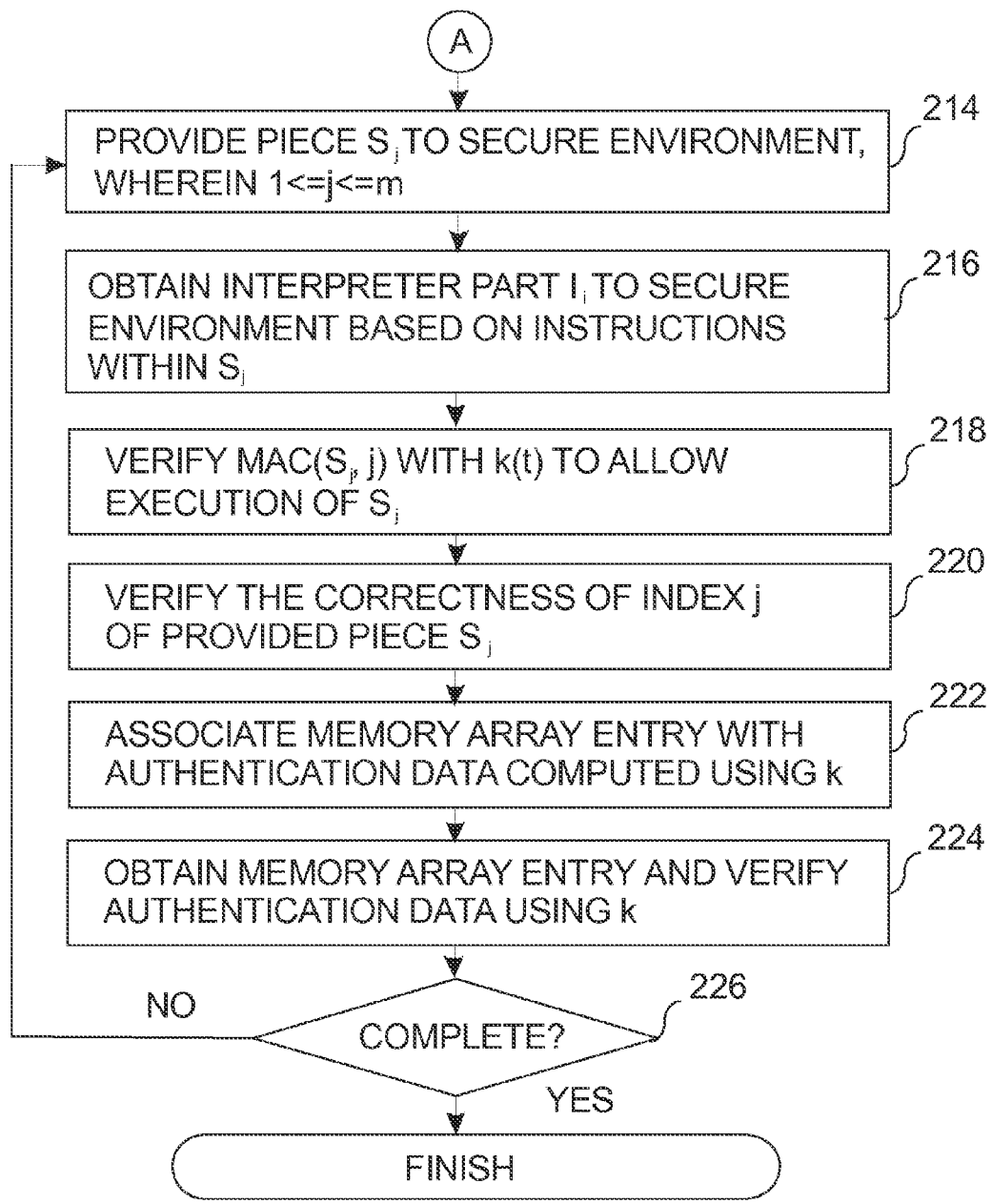
FIG. 2B is a flow chart illustrating a method for secure piecemeal program code interpretation in one embodiment of the invention.

Thereupon, the method continues at step 214 in FIG. 2B.

FIG. 2B is a flow chart illustrating a second part of a method for secure piecemeal program code interpretation in one embodiment of the invention.

At step 214 an authenticated program code piece $S_j$ furnished with a message authentication code is provided to a secure environment.

At step 216, in one embodiment of the invention, an interpreter part $I_i$ is obtained to secure environment based on instructions in piece $S_j$.

At step 218, the message authentication code associated with piece Sj is verified with k(t) used in FIG. 2A. In one embodiment of the invention, the verification is performed in the secure environment.

In one embodiment of the invention, a verification entity within the secure environment computes a second $MAC(S_j,j)'$ by setting $MAC(S_j,j)':=(AES_{k(t)}(j)$ XOR $TRUNC(SHA-1(S_j)))$, wherein k(t) is the previously computed key specific to the initialization and execution phase of program code S. This time AES encryption is also used, if AES encryption was used at the initialization phase by an initialization entity. Upon verifying a MAC that has been formed earlier using a cryptographic transformation, the cryptographic trans-formation is recalculated in the same way as at the time when the MAC was formed. In other words, the cryptographic transformation is used as a one-way transformation. If $MAC(S_j,j)'=MAC(S_j,j)$, the verification is successful and it is verified that $S_j$ has not been tampered in between. If verification fails, an alert is raised, for example, via a user interface within a computer and the execution may be terminated.

At step 220, in one embodiment of the invention, the index j of provided authenticated program code piece $S_j$ is verified. In one embodiment of the invention, it is verified that the program counter value q stored in the secure environment belongs to the range of the program code piece $S_j$ actually obtained to the secure environment. In other words, it is checked, if j<=q<j+o, wherein the authenticated slice obtained is $S_j$, o is the size of slice $S_j$ and j is the start address of slice $S_j$ relative to the start of program code S. The purpose of the checking is to ensure that the correct authenticated program code piece is provided from the set of authenticated program code pieces.

At step 222, in one embodiment of the invention, a memory entry is associated with a message authentication code computed using the key k. The association may be performed, for example, in the secure environment.

At step 224, in one embodiment of the invention, a memory array entry is obtained, for example, from a computer communicating with the secure environment, and a message authentication code is verified using k by re-computing the message authentication code using the value contained in the memory array entry. The association may be performed, for example, in the secure environment.

At step 226 it is checked if the execution of program code S is complete and it is no longer required to obtain more program code pieces to the secure environment. If execution is complete, the method is finished, otherwise a next authenticated program code piece to be obtained is determined and the next value for index j is further determined and method continues at step 214. The next value for index j may be obtained from a program counter stored in the secure environment.

Figure 3A:
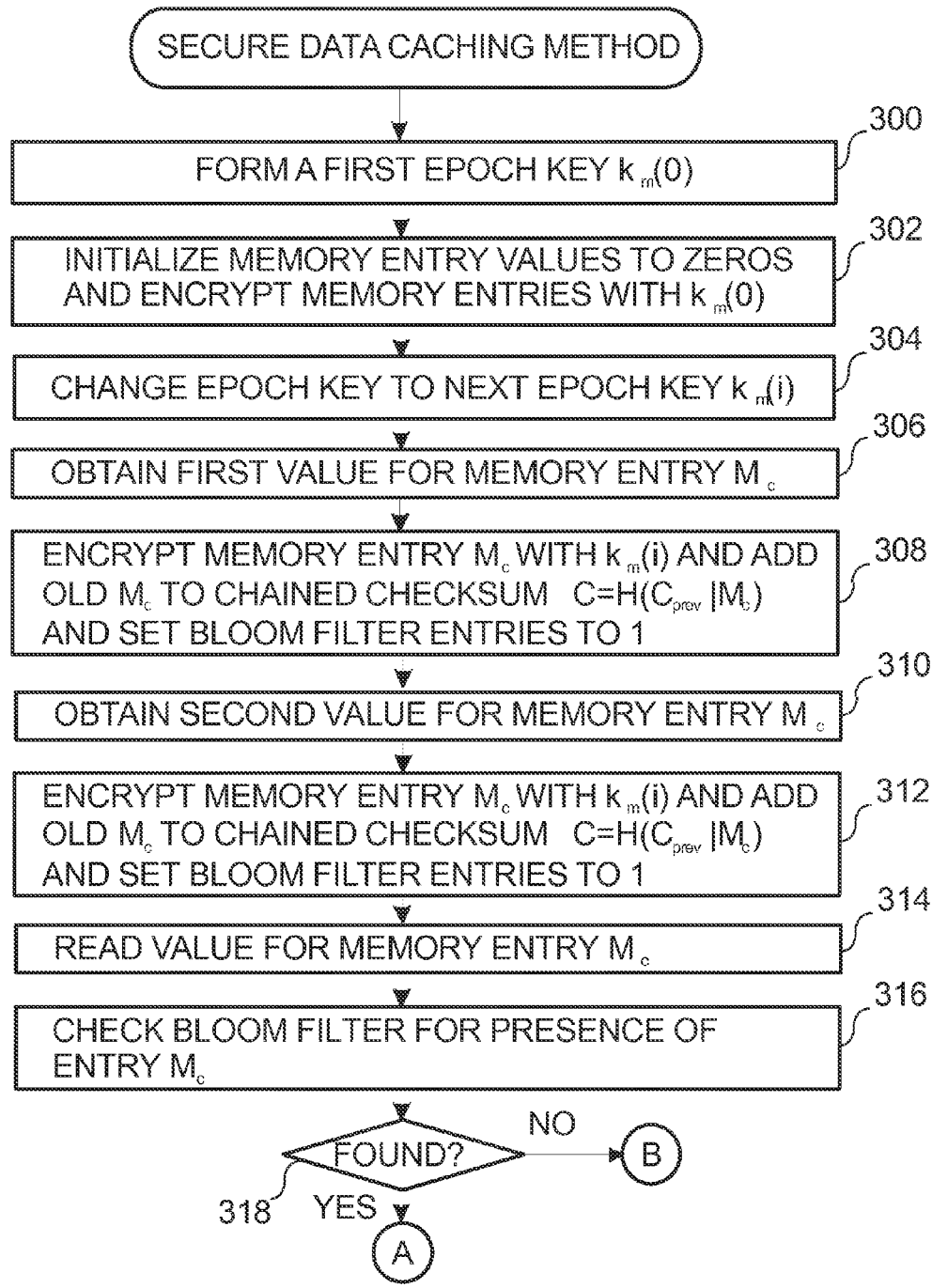
FIG. 3A is a flow chart illustrating a first phase of a method for secure data caching in one embodiment of the invention.

FIG. 3A is a flow chart illustrating a first phase of a method for secure data caching in one embodiment of the invention.

At step 300 a first epoch key $k_m(0)$ is determined, for example, by deriving it first using a cryptographic transform or any other function from the key k in FIGS. 1A, 1B and 2. In one embodiment of the invention, an epoch key is periodically changed to track for attacks wherein an old value memory entry is attempted to be fed to a program code in execution in a secure environment.

At step 302 memory entry values are initialized to zeros and memory entries are encrypted with key $k_m(0)$.

At step 304 the epoch key is changed from a previous epoch key $k_m(i-1)$ to a new epoch key $k_m(i)$. The value of i-1 may be, for example, 0. The new epoch key may be determined, for example, by deriving it first using a cryptographic transform or any other function from the key k in FIGS. 1A, 1B and 2 or the previous epoch key.

At step 306 a first value for memory entry $M_c$ is obtained. The index c may be, for example, a location indicator for the value of $M_c$ or other similar index to differentiate $M_c$ from other memory entries. A counter associated with $M_c$ may be incremented to indicate a change of the value in M. The counter may always be incremented as the value is changed.

At step 308 memory entry $M_c$ with the new value and the new counter value is encrypted with $k_m(i)$ and the old $M_c$ is added to a chained checksum $C:=H(C_{prev}|M_c)$ and bloom filters entries computed for $M_c$ are set to 1 or any other value indicating the 'true' Boolean value. $C_{prev}$ is the thus far computed checksum computed using previous memory entries. H is a hash function such as Secure Hash Algorithm 1 (SHA-1). In one embodiment merely a message authentication code is computed to be associated with memory entry $M_c$. Memory entry $M_c$ may be stored thereafter outside secure environment, for example, to computer 150 in FIG. 1A.

At step 310 a second value is obtained for memory entry $M_c$. The counter may be again incremented in $M_c$ to indicate a change of value.

At step 312 memory entry $M_c$ is again encrypted with $k_m(i)$ and the old $M_c$ is added to a chained checksum $C:=H(C_{prev}|M_c))$ and bloom filters entries computed for $M_c$ are set to 1. Memory entry $M_c$ may be stored thereafter outside secure environment, for example, to computer 150 in FIG. 1A.

At step 314 value for memory entry $M_c$ is read for a program code under execution in a secure environment. Memory entry $M_c$ may be read or retrieve from a device outside the secure environment, for example, from computer 150 in FIG. 1A.

At step 316 the bloom filter is checked for the presence of memory entry $M_c$. This may be a false positive or a first indication of an attempt to provide stale memory entries to the program code in the secure environment.

At step 318 it is checked if memory entry Mc was found. If it was found, the method continues at label A and step 320, else at label B and step 334.

Figure 3B:
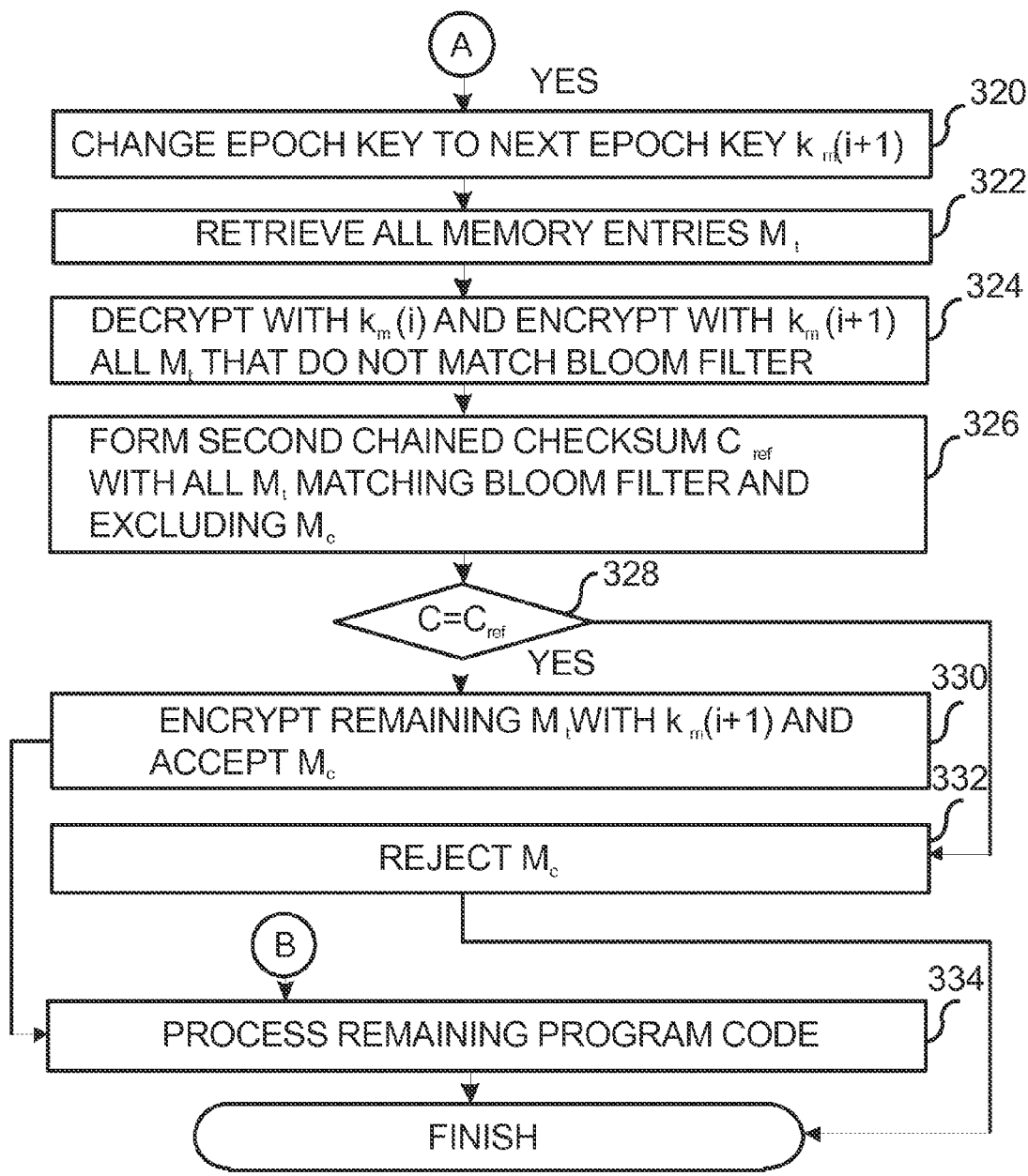
FIG. 3B is a flow chart illustrating a second phase of a method for secure data caching in one embodiment of the invention.

FIG. 3B is a flow chart illustrating a second phase of a method for secure data caching in one embodiment of the invention.

At step 320 the epoch key is changed once again in response to the positive result from the bloom filter to a new epoch key $k_m(i+1)$. The new epoch key may be determined, for example, by deriving it first using a cryptographic transform or any other function from the key k in FIGS. 1A, 1B and 2 or the previous epoch key.

At step 322 all memory entries $M_t$ all retrieved, wherein the value of t encompasses all memory entry indices. Memory entries may be retrieved via an interface unit, for example, from computer 150 illustrated in FIG. 1A.

At step 324 all memory entries $M_t$ that do not match bloom filter, that is, for which bloom filter does not indicate a true Boolean value, are decrypted with $k_m(i)$ and immediately encrypted with $k_m(i+1)$.

At step 326 a second chained checksum $C_{ref}$ with all $M_t$ matching the Bloom filter is formed, however, excluding from the second chained checksum memory entry $M_c$.

At step 328 it is checked if $C=C_{ref}$, that is, whether the Bloom filter indicated a false positive result. If this condition is true the method continues at step 330. Otherwise the method continues at step 332.

At step 330 remaining memory entries Mt are encrypted with $k_m(i+1)$ and $M_c$ is accepted for processing.

At step 332 memory entry $M_c$ is rejected and an indication is given from the secure environment.

At step 334 remaining program code is executed in the secure environment. Thereupon, the method is finished.

Figure 4:
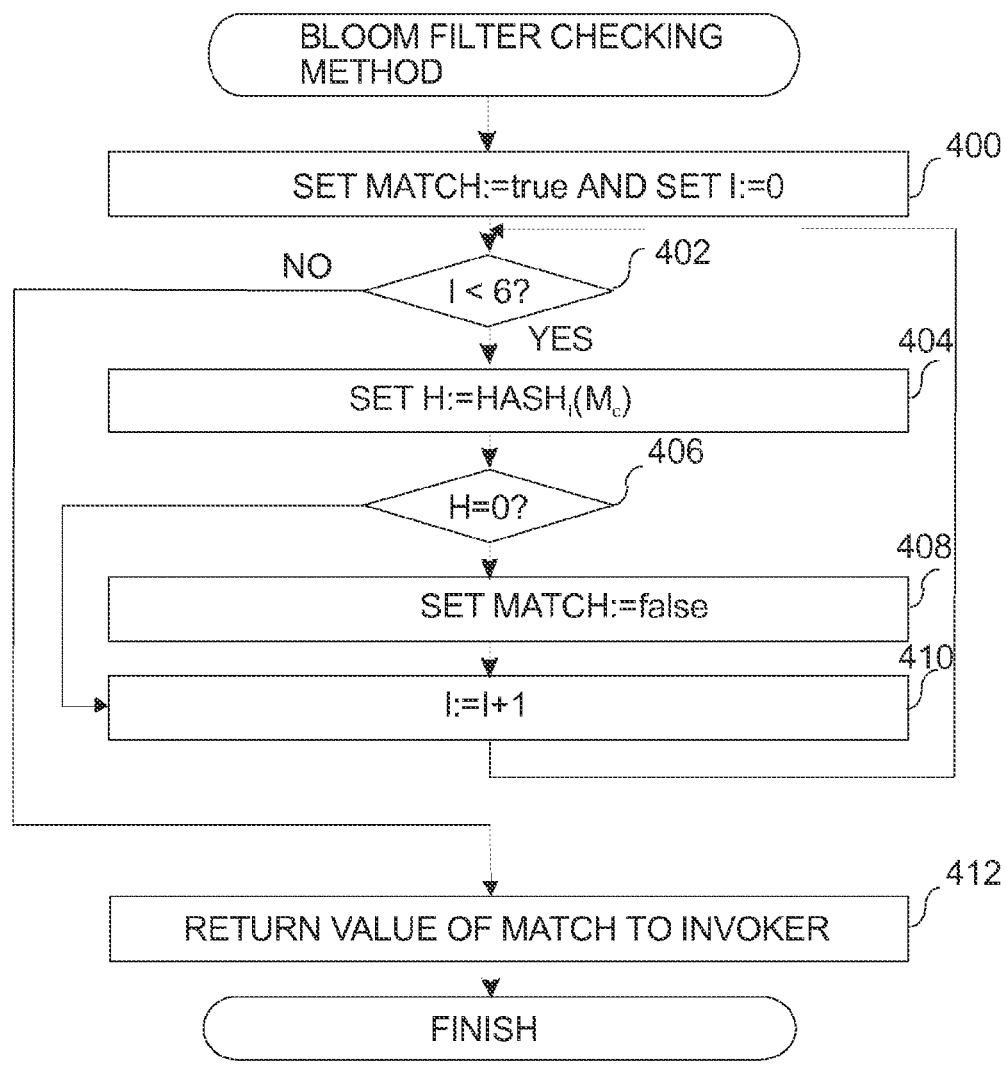
FIG. 4 is a flow chart illustrating a hash based filtering method in one embodiment of the invention.

FIG. 4 is a flow chart illustrating a Bloom filter checking method in one embodiment of the invention.

At step 400 a variable MATCH is set to 'true' and index I is set to 0.

At step 402 it is checked if I<6. If this condition is true the method continues at step 404, otherwise the method continues at step 410.

At step 404 variable H is set to $HASH_I(M_c)$, wherein $HASH_I$ is a hash function that varies based on index value.

At step 406 it is checked if H=0. If this condition is true the method continues at step 410, otherwise the method continues at step 408.

At step 408 the variable MATCH is set to 'false' to indicate that the location obtained with the hash function had a zero value.

At step 410 the index I is incremented by 1 and the method continues at step 402.

At step 412 the value of variable MATCH is returned to the method that initiated the Bloom filter checking method. Thus, Bloom filter matches for the memory entry Mc under scrutiny.

Figure 5:
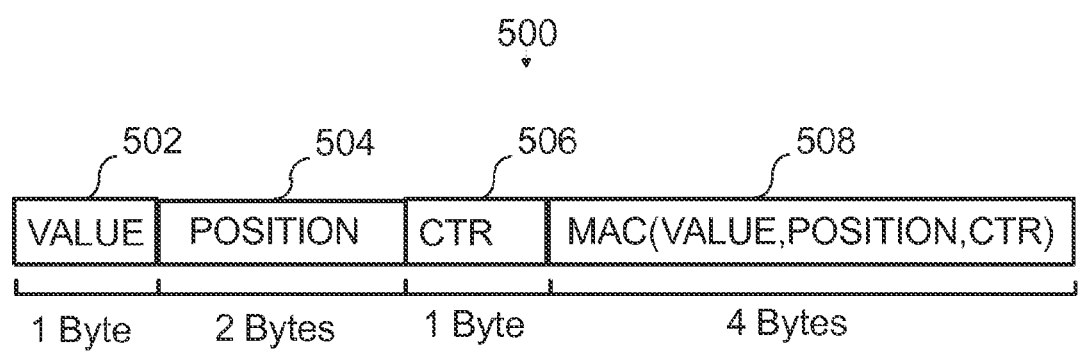
FIG. 5 is a block diagram illustrating a memory entry in one embodiment of the invention.

FIG. 5 is a block diagram illustrating a memory entry in one embodiment of the invention.

In FIG. 5 there is a memory entry 500, which comprises a value 502, a position 504, a counter 506 and a message authentication code 508, which is computed from value 502, position 504 and counter 506.

Counter 506 may always be incremented as value 502 is changed in memory entry 500. Counter 506 enables to secure the uniqueness of memory entries such as memory entry $M_c$ in FIGS. 3A and 3B, for example, during an epoch when the epoch key remains the same.

Figure 6:
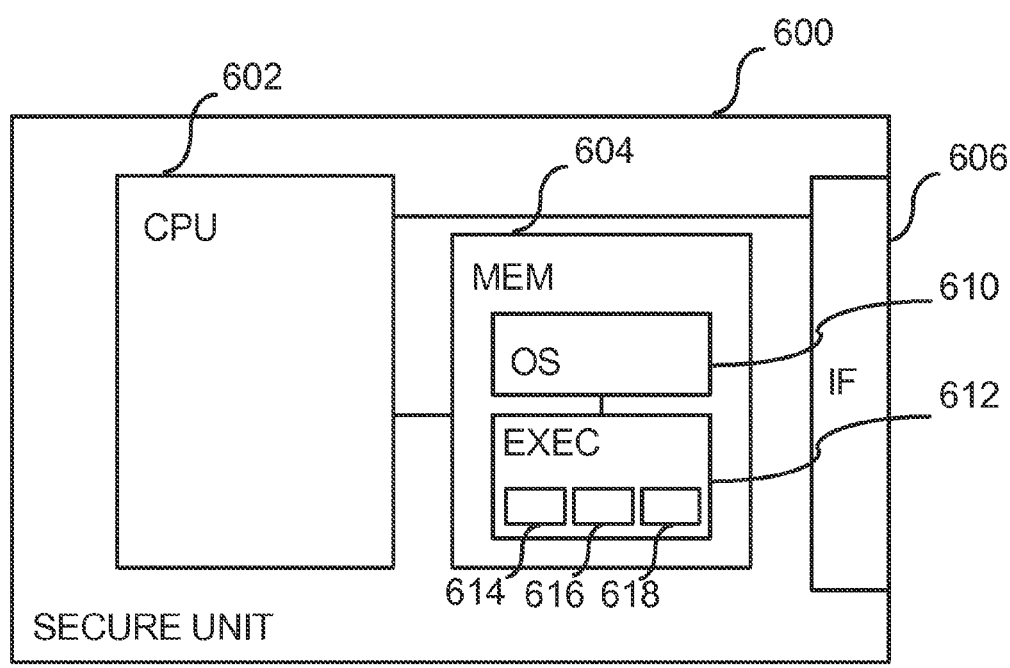
FIG. 6 is a block diagram illustrating an electronic device in one embodiment of the invention.

FIG. 6 is a block diagram illustrating an electronic device in one embodiment of the invention. The electronic device may be, for example, a trusted platform module, a security card, an USB device, a plug-in-unit, a computer node or an intelligent card. In FIG. 4 there is an electronic device 600. Electronic device 600 comprises a processor 602 and a memory 604. When processor 602 executes functionalities associated with the invention, memory 604 comprises, for example, an operating system entity 610 and an execution entity 612, in other words, a secure environment. Execution entity 612 further comprises an initialization entity 614, which, for example, is configured to form authenticated program code pieces, a verifier entity 616 configured to verify message authentication codes and a memory management entity 618. Each of entities 614-618 within execution entity 612 has access to cryptographic functionalities such as, for example, key generation, authentication, encryption, decryption, cryptographic transformation, hash functions, data digests and one-way functions. In one embodiment of the invention entities 614-618 are independent and separate from execution entity 612. Electronic device 600 also comprises an interface unit, in other words, an interface 606 for communicating with another electronic device such as a computer.

In one embodiment of the invention, execution entity 612 is comprised in the operating system entity 610 in electronic device 600. In one embodiment of the invention, entities 614-618 from execution entity 612 are comprised in the operating system entity 610 in electronic device 600.

The entities within electronic device 600 in FIG. 6, such as operating system entity 610 and execution entity 612 and entities 614-618 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity. The entities in FIG. 6 may also be stored in separate memories and executed by separate processors, which communicate, for example, via a message bus or an internal network within the network node. An example of such a message bus is the Peripheral Component Interconnect (PCI) bus.

Figure 7:
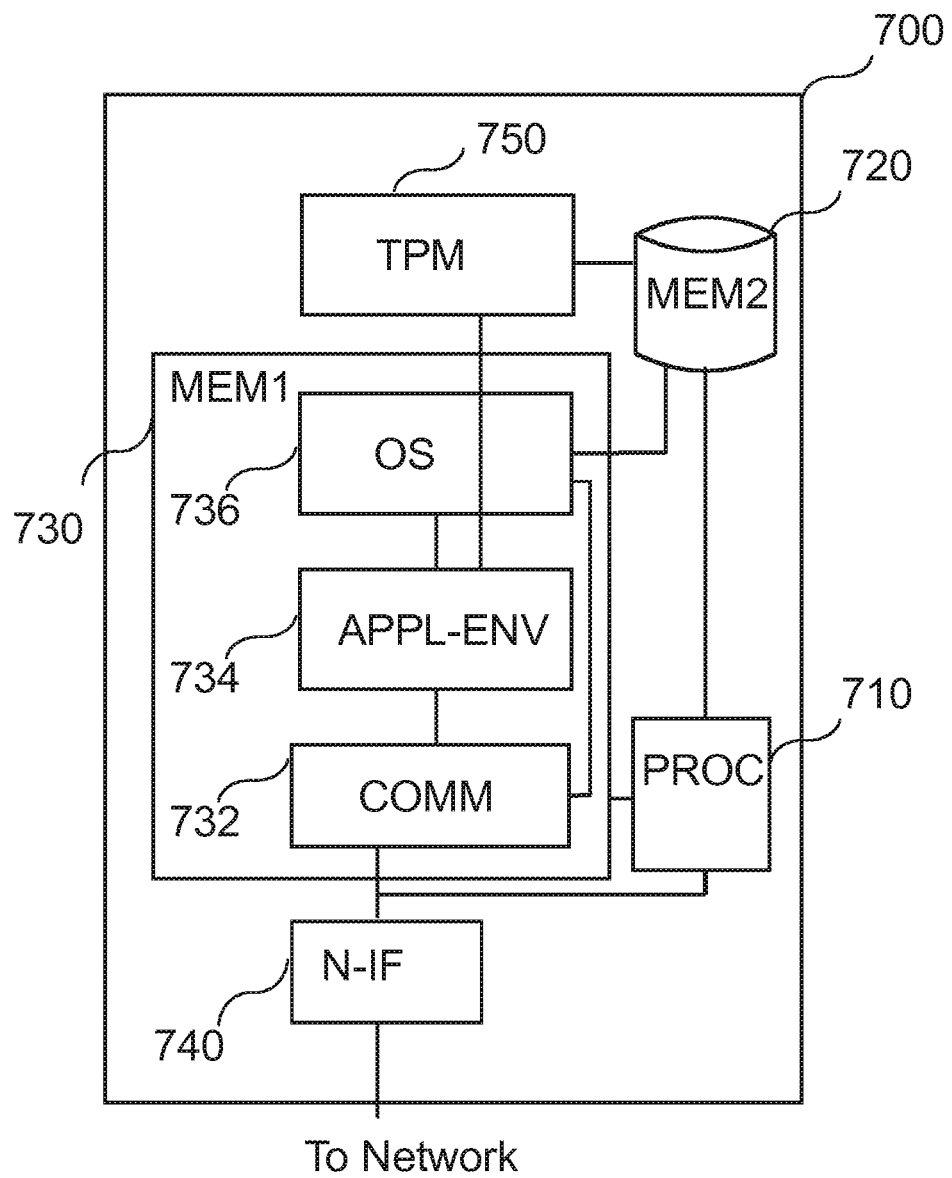
FIG. 7 is a block diagram illustrating an electronic device in one embodiment of the invention.

FIG. 7 is a block diagram illustrating an electronic device in one embodiment of the invention. The electronic device may be, for example, a mobile station, a laptop computer, a tabletop computer or a palmtop computer. The mobile station may be a mobile telephone, a personal digital assistant (PDA), a pager, a digital camera or camcorder, a position detection device, or any combination of the aforementioned. In FIG. 7 there is an electronic device 700. Electronic device 700 comprises a processor 710 and a secondary memory 720. The secondary memory may be, for example, a hard disk or a flash memory or an optic disk. Electronic device 700 comprises also a primary memory 730. When processor 710 executes functionalities associated with the invention primary memory 730 comprises, for example, a communication entity 732, an application environment 734 and an operating system entity 736. Electronic device 700 also comprises one or more network interface units such as network interface unit 740. Communication entity 732 comprises the communication functions, for example, Internet Protocol functions. Network interface 740 may be, a radio interface comprising, for example, a Wireless Local Area Network (WLAN) interface, a Bluetooth interface, a Wimax interface, a UWB (ultra wide band), low power radio frequency interface and a radio interface for a mobile telecommunication network. Electronic device 700 may also comprise a trusted platform module 750, which communicates with operating system entity 736 and application environment 734. Within electronic device 700 there may also be software entities responsible for supporting the function of trusted platform module 750 such as application environment 734.

In one embodiment of the invention, communication entity 732 is comprised in the operating system of electronic device 700. The entities within electronic device 700 in FIG. 7, such as communication entity 732, application environment 734 and operating system entity 736 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity. The entities in FIG. 7 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (e.g., voice, modem, and the like), wireless communications media, one or more wireless communications networks, cellular communications networks, G3 communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
   obtaining a program code to a first electronic device;
   splitting said program code to at least two first program code pieces;
   providing a first program code piece to a second electronic device, said first program code piece being one of said at least two first program code pieces;
   receiving a message authentication code computed from said first program code piece in said second electronic device, wherein said message authentication code comprises a first authenticated program code piece, said first authenticated program code piece comprising said first program code piece and said message authentication code;
   detecting a need to execute said program code in said first electronic device;
   providing said first authenticated program code piece to said second electronic device;
   verifying said message authentication code from said first authenticated program code piece in order to allow the execution of said first program code piece in said second electronic device;
   computing a program hash code using said at least two first program code pieces;
   computing a storage key from a device secret associated with said second electronic device and said program hash code;
   computing authentication data from a memory entry using said storage key in said first electronic device;
   associating said memory entry with said authentication data in said first electronic device;
   storing said memory entry and said authentication data to said first electronic device;
   obtaining said memory entry and said authentication data to said second electronic device;
   verifying said authentication data with said second electronic device; and
   providing said memory entry to a second program code piece to be executed in said second electronic device, said second program code piece being one of said at least two first program code pieces.

2. The method according to claim 1, the method further comprising:
   analyzing said first program code piece to determine at least one operation code;
   determining an interpreter part based on said at least one operation code; and
   obtaining said interpreter part to said second electronic device.

3. The method according to claim 1, wherein the method further comprises:
   forming a first epoch key in said second electronic device;
   replacing said first epoch key with a second epoch key;
   obtaining a first value for a first memory entry;
   encrypting said first memory entry with said second epoch key;
   adding said first memory entry to a first chained checksum;
   setting an indicator value in at least one hash bucket computed using said first memory entry;
   providing said first memory entry to said first electronic device;
   obtaining a second value for said first memory entry;
   encrypting second time said first memory entry with said second epoch key;
   adding second time said first memory entry to said first chained checksum; and
   setting second time an indicator value in at least one hash bucket computed using said first memory entry.

4. The method according to claim 3, wherein the method further comprises:
   checking the at least one hash bucket whether said indicator value is set;
   replacing said second epoch key with a third epoch key;
   retrieving at least three memory entries, said at least three memory entries comprising said first memory entry;
   decrypting and encrypting the memory entries where the at least one hash bucket does not have said indicator value set, said at memory entries being among said at least three memory entries;
   forming a second chained checksum, which does not comprise said first memory entry;
   comparing said first chained checksum and said second chained checksum; and
   accepting said first memory entry if said checksums match.

5. The method according to claim 1, wherein the method further comprises:
   computing said message authentication code using counter mode encryption using an identifier or a start address of said first program code piece.

6. The method according to claim 1, wherein said message authentication code is computed using advanced encryption standard.

7. The method according to claim 1, wherein said second electronic device comprises a trusted platform module.

8. The method according to claim 1, wherein said first electronic device comprises a mobile communication device.

9. An apparatus, comprising:
   at least one processor; and
   at least one memory including computer program code, where the at least one memory and the computer program code are configured, with the at least one processor, to cause the apparatus to at least:
   receive a first program code piece from an interface, said first program code piece being one of at least two first program code pieces from a program code;
   compute a message authentication code from said first program code piece to produce a first authenticated program code piece, said first authenticated program code piece comprising said first program code piece and said message authentication code;
   provide said first authenticated program code piece to said interface;
   receive said first authenticated program code piece from said interface;
   verify said message authentication code from said first authenticated program code piece in order to allow the execution of said first program code piece;
   compute a program hash code using said at least two first program code pieces; and
   compute a storage key from a device secret associated with said electronic device and said program hash code;
   compute authentication data from a memory entry using said storage key;
   associate said memory entry with said authentication data, submit said memory entry and said authentication data for storage via said interface;
   receive said memory entry and said authentication data and to verify said authentication data; and provide said memory entry to a second program code piece being executed, said second program code piece being one of said at least two first program code pieces.

10. The apparatus according to claim 9, wherein the at least one memory including the computer program code is configured with the at least one processor to cause the apparatus to:
analyze said first program code piece to determine at least one operation code, to determine an interpreter part based on said at least one operation code; and
request said interpreter part to from said interface.

11. The apparatus according to claim 9, wherein the at least one memory including the computer program code is configured with the at least one processor to cause the apparatus to:
form a first epoch key, to replace said first epoch key with a second epoch key;
obtain a first value for a first memory entry;
encrypt said first memory entry with said second epoch key;
add said first memory entry to a first chained checksum;
set an indicator value in at least one hash bucket computed using said first memory entry;
send said first memory entry to said interface;
obtain a second value for said first memory entry;
encrypt second time said first memory entry with said second epoch key;
add second time said first memory entry to said first chained checksum; and
set second time an indicator value in at least one hash bucket computed using said first memory entry.

12. The apparatus according to claim 11, wherein the at least one memory including the computer program code is configured with the at least one processor to cause the apparatus to:
check the at least one hash bucket whether said indicator value is set, to replace said second epoch key with a third epoch key;
retrieve at least three memory entries via said interface, said at least three memory entries comprising said first memory entry;
decrypt and encrypt the memory entries where the at least one hash bucket does not have said indicator value set, said at memory entries being among said at least three memory entries;
form a second chained checksum, which does not comprise said first memory entry, to compare said first chained checksum and said second chained checksum; and
accept said first memory entry if said checksums match.

13. The apparatus according to claim 9, wherein the at least one memory including the computer program code is configured with the at least one processor to cause the apparatus to:
compute said message authentication code using counter mode encryption using an identifier or a start address of said first program code piece.

14. A non-transitory computer program embodied on a computer readable medium, the computer program comprising code for controlling a processor to execute a method comprising:
receiving a first program code piece from an interface, said first program code piece being one of at least two first program code pieces from a program code;
computing a message authentication code from said first program code piece to produce a first authenticated program code piece, said first authenticated program code piece comprising said first program code piece and said message authentication code;
providing said first authenticated program code piece to said interface;
receiving said first authenticated program code piece from said interface;
verifying said message authentication code from said first authenticated program code piece in order to allow the execution of said first program code piece;
compute a program hash code using said at least two first program code pieces; and
compute a storage key from a device secret associated with said electronic device and said program hash code;
computing authentication data from a memory entry using said storage key;
associating said memory entry with said authentication data, submit said memory entry and said authentication data for storage via said interface;
receiving said memory entry and said authentication data and to verify said authentication data; and
providing said memory entry to a second program code piece being executed, said second program code piece being one of said at least two first program code pieces.

* * * * *